United States Patent
Blumenschein

(10) Patent No.: US 10,160,683 B2
(45) Date of Patent: Dec. 25, 2018

(54) WASTEWATER TREATMENT PROCESSES EMPLOYING HIGH RATE CHEMICAL SOFTENING SYSTEMS

(71) Applicant: Veolia Water Solutions & Technologies Support, Saint Maurice (FR)

(72) Inventor: Charles Blumenschein, Pittsburgh, PA (US)

(73) Assignee: Veolia Water Solutions & Technologies Support, St. Maurice (FR)

( * ) Notice: Subject to any disclaimer, the term of this patent is extended or adjusted under 35 U.S.C. 154(b) by 225 days.

(21) Appl. No.: 14/892,747

(22) PCT Filed: May 22, 2014

(86) PCT No.: PCT/US2014/039063
§ 371 (c)(1),
(2) Date: Nov. 20, 2015

(87) PCT Pub. No.: WO2014/190112
PCT Pub. Date: Nov. 27, 2014

(65) Prior Publication Data
US 2016/0102006 A1  Apr. 14, 2016

Related U.S. Application Data

(60) Provisional application No. 61/826,732, filed on May 23, 2013.

(51) Int. Cl.
*C02F 9/00* (2006.01)
*C02F 5/02* (2006.01)
(Continued)

(52) U.S. Cl.
CPC .............. *C02F 9/00* (2013.01); *C02F 1/04* (2013.01); *C02F 1/20* (2013.01); *C02F 1/42* (2013.01);
(Continued)

(58) Field of Classification Search
None
See application file for complete search history.

(56) References Cited

U.S. PATENT DOCUMENTS 7,428,926 B2   9/2008 Heins
7,849,921 B2  12/2010 Heins
(Continued)

*Primary Examiner* — Kara M Peo
(74) *Attorney, Agent, or Firm* — Coats & Bennett, PLLC

(57) ABSTRACT

A ballasted flocculation system that chemically softens water and causes hardness particles to precipitate from the water and crystallize. In the course of crystallizing, the hardness particles grow and form ballasted floc that are separated from the water in the form of sludge by a clarification unit, producing a clarified effluent. The separated sludge including the hardness crystals is directed to a separator where the sludge is separated into two streams with each stream having hardness crystals contained therein. In one process design, one stream includes relatively small hardness crystals and the other stream includes relatively large hardness crystals. The stream having the relatively small hardness crystals is directed to a first reactor and mixed with the incoming water and a softening reagent. The stream having the relatively large crystals is directed to a second downstream reactor and mixed with water and a flocculant which facilitates the growth of the hardness crystals.

15 Claims, 7 Drawing Sheets

(51) Int. Cl.
  *C02F 1/04* (2006.01)
  *C02F 1/20* (2006.01)
  *C02F 1/42* (2006.01)
  *C02F 1/44* (2006.01)
  *C02F 1/52* (2006.01)
  *C02F 1/66* (2006.01)
  *E21B 43/24* (2006.01)
  *E21B 43/34* (2006.01)
  *E21B 43/40* (2006.01)
  *C02F 1/40* (2006.01)
  *C02F 1/00* (2006.01)
  *C02F 101/32* (2006.01)
  *C02F 103/02* (2006.01)
  *C02F 103/36* (2006.01)
  *C02F 103/10* (2006.01)

(52) U.S. Cl.
  CPC .............. *C02F 1/441* (2013.01); *C02F 1/444* (2013.01); *C02F 1/5236* (2013.01); *C02F 1/66* (2013.01); *C02F 5/02* (2013.01); *E21B 43/24* (2013.01); *E21B 43/34* (2013.01); *E21B 43/40* (2013.01); *C02F 1/048* (2013.01); *C02F 1/40* (2013.01); *C02F 1/5245* (2013.01); *C02F 2001/007* (2013.01); *C02F 2001/5218* (2013.01); *C02F 2101/32* (2013.01); *C02F 2103/023* (2013.01); *C02F 2103/10* (2013.01); *C02F 2103/365* (2013.01); *C02F 2301/046* (2013.01); *C02F 2305/04* (2013.01); *C02F 2305/12* (2013.01)

(56) References Cited

U.S. PATENT DOCUMENTS

| | | |
|---|---|---|
| 7,905,283 B2 | 3/2011 | Minnich et al. |
| 2002/0088758 A1 | 7/2002 | Blumenschein et al. |
| 2009/0056945 A1 | 3/2009 | Minnich et al. |
| 2009/0127091 A1 | 5/2009 | Heins |
| 2011/0023715 A1* | 2/2011 | Nagghappan ............ C02F 9/00 95/259 |
| 2012/0160770 A1 | 6/2012 | Banerjee et al. |
| 2012/0255904 A1 | 10/2012 | Nagghappan |

* cited by examiner

WASTEWATER TREATMENT PROCESSES EMPLOYING HIGH RATE CHEMICAL SOFTENING SYSTEMS

FIELD OF THE INVENTION

The present invention relates to wastewater treatment processes and more particularly wastewater treatment processes that utilize softening processes to remove hardness from a wastewater stream.

SUMMARY OF THE INVENTION

The present invention relates to a high rate softening process where a softening reagent is mixed with water being treated. Hardness particles precipitate from the water and form crystals. The hardness crystals are suspended solids produced by the process. The solids are separated from the water, producing a clarified effluent. More particularly, the solids are directed to a solids separation device which separates the solids into two streams with each stream containing hardness crystals. In one embodiment, the process utilizes first and second reactors. In this embodiment, one solids stream is directed to one reactor and the other solids stream is directed to the second reactor. In both cases, the reactors include mixers that mix the hardness crystals with the water being treated, which further encourages the crystallization of precipitated hardness particles.

In one process design, the solids separation device separates the solids into a first stream having relatively small hardness crystals and a second stream having relatively large hardness crystals. The first solids stream is mixed with the softening reagent and water in the first reactor while the second stream having the relatively large hardness crystals is mixed with the water in the second downstream reactor. Hardness particles precipitated in the first reactor begin to crystallize. Water, along with hardness crystals, is transferred from the first reactor to the downstream second reactor where the hardness crystals continue to grow. Mixing the relatively small hardness crystals in the first reactor and the relatively large hardness crystals in the second reactor promotes an orderly and efficient crystallization process that is effective in facilitating the removal of hardness and suspended solids from the water.

In another embodiment, the high rate softening process can be implemented without the use of sand. Here the hardness crystals grow and effectively form a ballast. When the clarifying unit employed is a settling tank, these relatively large crystals can be used as ballasts that, when used with flocculants, may attract hardness, non-hardness precipitants and other suspended solids and which will settle relatively fast in the settling tank. This increases the efficiency of removing hardness, other precipitants, and suspended solids from the water.

The present invention also relates to wastewater treatment processes that utilize the high rate chemical softening process discussed above. For example, the high rate chemical softening process discussed above can be employed to treat produced water, cooling tower blowdown or used in various wastewater treatment processes that employ membrane separation equipment or other equipment where it is important or desirable to remove hardness from the wastewater stream to prevent scaling or fouling of system equipment.

Other objects and advantages of the present invention will become apparent and obvious from a study of the following description and the accompanying drawings which are merely illustrative of such invention.

DESCRIPTION OF EXEMPLARY EMBODIMENTS

Figure 1:
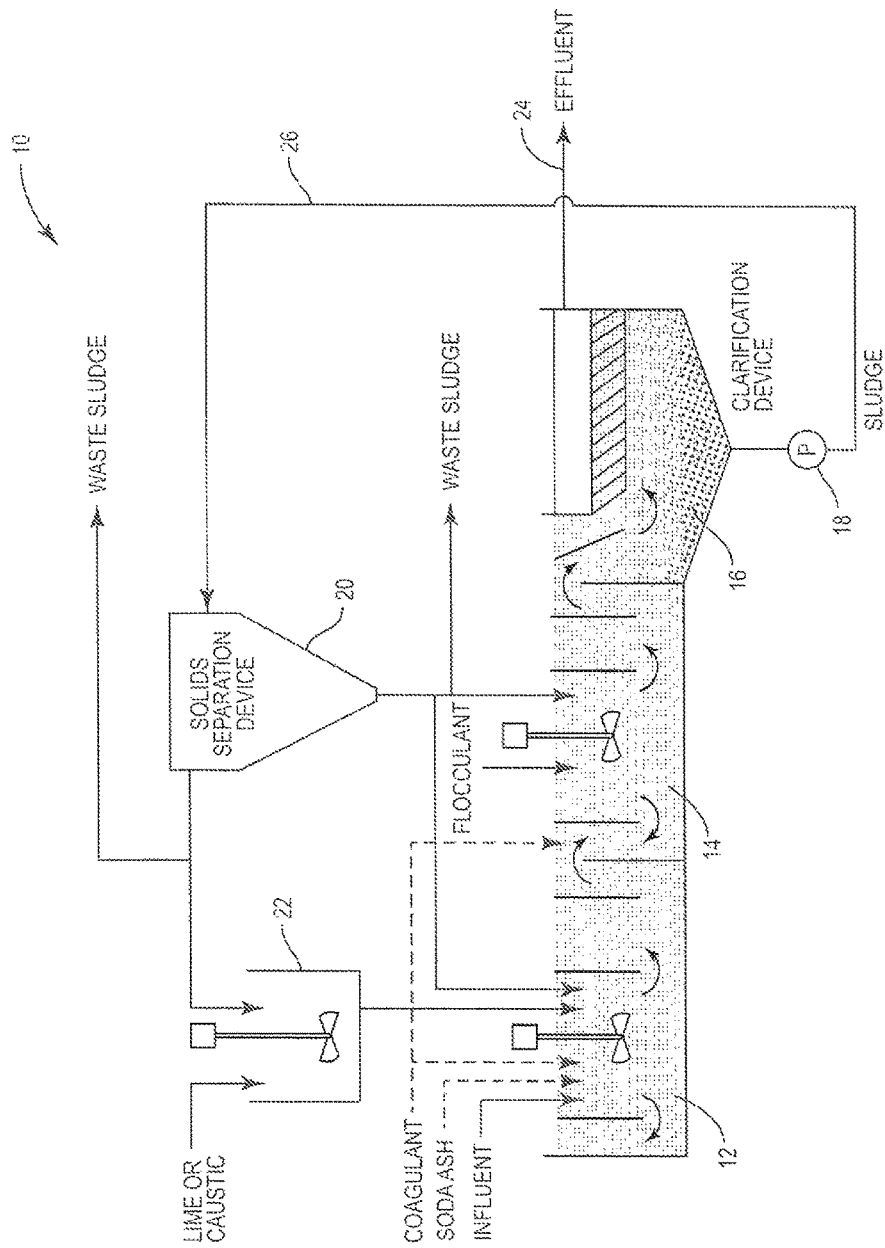
FIG. 1 is a schematic illustration of the high rate softening process of the present invention.

The present invention entails a process for softening water in a ballasted flocculation system which can be carried out without using sand as a ballast. A softening reagent, such as lime, caustic and/or soda ash, is mixed with water having hardness. This results in hardness particles, such as calcium carbonate, precipitating. The process of the present invention is designed to encourage certain hardness particles to crystallize, resulting in the hardness particles growing into relatively large crystals. These relatively large crystals containing hardness particles settle relatively fast in a settling tank provided in one embodiment of the present invention. To promote hardness crystal growth and efficient hardness removal, these hardness crystals are recovered and returned to the mainstream where they are mixed with the water being treated. In one example, as explained below, the settled solids or sludge recovered in the settling tank which contains the hardness crystals and other suspended solids is directed to a solids separation unit that separates the solids into a sludge stream having relatively small hardness crystals and a sludge stream having relatively large hardness crystals. In this example, the system includes first and second reactors. The sludge stream having the relatively small hardness crystals is directed to the first reactor where the relatively small hardness crystals are mixed with the softening reagent or reagents and the water being treated. The small hardness crystals act a seed to promote the growth of larger hardness crystals in the first reactor. This process encourages the rapid growth of hardness crystals. The sludge stream having the relatively large hardness crystals is mixed with the water and a flocculant in the second downstream reactor. The large hardness crystals act as a ballast to which smaller particles and other suspended solids can attach and thereby form a floc that contains various contaminants that are targeted for removal from the water being treated.

In one embodiment, the present invention entails a method or process for treating produced water recovered from an oil well. The method includes recovering an oil-water mixture from the oil well and separating the oil from the oil-water mixture to produce an oil product and produced water having hardness and suspended solids. Thereafter, the produced water is subjected to an enhanced softening process to remove hardness. This includes reacting a softening reagent with the produced water and precipitating hardness precipitants or particles. The method or process also includes crystallizing the hardness precipitants and causing the hardness precipitants to grow and form hardness crystals. The process also includes utilizing a solids separation device to separate the hardness crystals from the produced water. In one embodiment, this produces a first stream having hardness crystals therein and a second stream. The method or process further includes recycling at least a portion of the first stream with the hardness crystals therein to a point upstream of the solids separation device and mixing the hardness crystals in the first stream with the produced water which facilitates the formation of hardness crystals. The second stream that is relatively clear or clarified and includes less hardness crystals than the first stream is directed to a membrane separation unit. The method includes filtering the second stream with the membrane separation unit to produce a permeate stream and a reject stream. Then the permeate stream from the membrane separation unit is directed, directly or indirectly, to a downstream evaporator or reverse osmosis unit where the permeate stream for the membrane separation unit, which could in one embodiment be a ceramic membrane, is treated or purified. In an embodiment employing the evaporator, the evaporator evaporates a portion of the permeate stream and produces a relatively pure distillate. In the case of an embodiment employing a reverse osmosis unit, the reverse osmosis unit removes dissolved solids from the permeate stream.

In another embodiment, the present invention treats a feedwater stream such as produced water recovered from an oil well. This process includes recovering an oil-water mixture from the oil well and separating oil from the oil-water mixture to produce an oil product and produced water having hardness and suspended solids. Next, the produced water is subjected to an enhanced softening process for removing hardness from the produced water. This includes reacting a softening reagent with the produced water and producing hardness precipitants or particles. The process also entails crystallizing the hardness particles or precipitants. This causes the hardness precipitants to grow and form hardness crystals. This process also entails clarifying the produced water having the hardness crystals therein to produce a clarified effluent and a sludge having the hardness crystals therein. Further, the process entails directing the sludge to a separator and separating the sludge into two streams, a first stream having hardness crystals therein and a second stream having hardness crystals therein. In addition, the method includes mixing the first stream having the hardness crystals therein with the produced water and softening reagent at a first location in the softening process and mixing the second stream with the hardness crystals therein with the produced water at a second location downstream from the first location. In this process, the hardness crystals continue to grow and form hardness ballast. This process also entails agglomerating suspended solids in the produced water around the hardness ballast. Note that an external ballast such as micros and is not required here. By crystallizing the hardness particles and forming them into ballast, the process uses the hardness ballast to remove suspended solids and to facilitate the settling of suspended solids and sludge in general. A portion of the sludge produced may be wasted. The method or process further includes directing the clarified effluent produced in the enhanced softening process to a membrane separation unit which, in one embodiment, could be a ceramic membrane. The method, in this embodiment, concludes both filtering the clarified effluent with the membrane separation unit to produce a permeate stream and a reject stream.

Turning to FIG. 1, a high rate chemical softening system is shown therein and indicated generally by the numeral 10. As seen in FIG. 1, the system includes a first reactor or tank 12 and a second downstream reactor or tank 14. Both of these reactors can be fitted with draft tubes to enhance mixing. Downstream of the second reactor 14 is a clarification unit 16 which, in the case of the embodiment disclosed, is a settling tank. As will be discussed, sludge settles to the bottom of the settling tank and a pump 18 is utilized to pump the sludge and the solids contained therein via line 26 to a solids separation device 20. Solids separation device 20 can assume various forms. It may include a sophisticated solids separation device such as a hydrocyclone, but for the purposes of the present invention, the solids separation device can be of a simple design, such as a swirl concentrator, elutriator or a conical bottomed tank. Solids separation device 20 produces two sludge streams, one stream directed to a mixing tank 22 and another stream directed back to the second reactor 14. As illustrated in FIG. 1, portions of each sludge stream can be wasted.

Now turning to the process of the present invention, the system 10 is designed to soften or remove hardness from water. The influent wastewater that is treated by the system shown in FIG. 1 typically contains hardness, mainly in the form of calcium and magnesium. Other forms of hardness, such as strontium, barium, iron, and manganese, may be present. Generally, the goal in a typical softening process is to convert calcium and magnesium compounds to calcium carbonate and magnesium hydroxide precipitants.

In the case of one embodiment, the present invention envisions mixing lime, either hydrated lime ($CaOH_2$) or quicklime (CaO) with the water to be treated. Lime can be mixed with the water directly in tank 12 or, as shown in FIG. 1, the lime can be mixed with one of the sludge streams produced by the solids separation device 20 in the mixing tank 22 and that mixture is directed into the first reactor 12. Either approach will work. In some cases, a coagulant such as a ferric salt can be added to the water, in either tank 12 or 14, for the purpose of destabilizing suspended solids and precipitants. However, in the case of the process depicted in FIG. 1, it is believed that a coagulant is unnecessary because of the relatively large amounts of solids that are present in the system.

Mixing lime with the water will result in the lime preferentially reacting with carbon dioxide and bicarbonates to cause calcium carbonate to precipitate as calcium carbonate particles. This ordinarily occurs at a pH of approximately 10 to approximately 10.3. Once the carbon dioxide demand has been met, the lime is free to react with calcium bicarbonate, for example, which further results in the precipitation of calcium carbonate particles. Calcium bicarbonate is typically the most common calcium compound found in untreated water but other calcium-based hardness compounds have similar reactions. Magnesium compounds have a slightly different reaction. Generally, magnesium bicarbonate reacts with lime and produces calcium carbonate and magnesium carbonate. Then the magnesium carbonate reacts with lime and creates more calcium carbonate and magnesium hydroxide. Both of these compounds precipitate out of water.

In some cases, it may be desirable to remove non-carbonate hardness. As an option, soda ash can be mixed with the water in the first reactor 12. Non-carbonate hardness compounds will have slightly different reactions. In the case of magnesium sulfate, for example, lime first reacts with magnesium sulfate to form magnesium hydroxide, which will precipitate out of solution, and calcium sulfate. The calcium sulfate then reacts with soda ash ($NaCO_3$), producing calcium carbonate and sodium sulfate.

Other softening processes can be employed. For example, depending on the chemistry of the influent wastewater, a caustic such as sodium hydroxide can be used in combination with soda ash to precipitate hardness. It should also be noted that where the influent wastewater includes a considerable concentration of sulfate, softening processes as described above will precipitate calcium sulfate.

The process of the present invention is designed to encourage the precipitated hardness particles, particularly calcium carbonate particles, to crystallize. As will be discussed later, downstream processes that recycle solids facilitate and promote the crystallization of hardness particles and other solids in the water.

When lime is mixed with the water in reactor 12, this causes hardness particles to precipitate and the mixing action in reactor 12 allows the hardness particles to crystallize and grow in size. It is contemplated that the calcium carbonate particles precipitating in reactor 12 and those returned to reactor 12 will grow. This is facilitated by the continuous mixing of the water and hardness crystals in the reactor 12 and particularly the mixing in the draft tube contained therein The purpose of the draft tube is to facilitate and encourage the continued crystal growth in reactor 12, sometimes referred to as primary nucleation. Primary nucleation of the crystals should occur in the first reactor 12. The reaction time in tank 12 can vary but in one embodiment reaction time should be relatively short. For example, the reaction time in reactor 12 may be only approximately 5 to approximately 10 minutes. In one embodiment, the process may not drive the softening chemistry to completion in reactor 12. In other cases, the softening chemistry may be completed in the first reactor 12.

It is recognized that some hardness particles may not readily crystallize to the extent of others, such as calcium carbonate. For example, magnesium hydroxide particles will not significantly crystallize and, hence, throughout the process will assume very fine particle sizes.

Water from reactor 12, along with hardness particles, is transferred to the second downstream reactor 14. There a flocculant is mixed with the water as well as solids from the solids separation device 20. The nature of the solids from the solids separation device 20 that are mixed with the water in the second reactor 14 will be subsequently discussed. In some cases, the softening chemistry may not have been completed in reactor 12 and, thus, the softening reactions continue until completion in reactor 14. In reactor 14 the hardness crystals continue to grow. This is facilitated by the continuous mixing of the water, flocculant and hardness crystals in the reactor 14 and particularly the mixing in the draft tube contained therein. The purpose of the draft tube is to facilitate and encourage the continued crystal growth in reactor 14, sometimes referred to as secondary nucleation.

In the second reactor, the hardness crystals become relatively large compared to the crystals in the first reactor 12. As the crystals grow larger, they form ballasts. The formation of ballasts plus the use of flocculants results in other suspended solids agglomerating around the ballasts to form floc. These floc are relatively heavy and, hence, settle fast. While the residency time in the second reactor 14 may vary, it is contemplated that, in one embodiment, the residency time of the water in the second reactor can be relatively short, on the order of approximately 5 to approximately 10 minutes.

Water and solids from reactor 14 are directed into a clarifying unit which, in the example shown in FIG. 1, is a clarification unit 16. There the solids, including the hardness crystals, settle to the bottom of the clarification unit 16. Because the hardness crystals have grown and are relatively large and heavy, their settling speed is relatively fast. The settling of the sludge produces a clarified effluent that is directed from clarification unit 16 via line 24.

Settled sludge in the bottom of clarification unit 16 is pumped by pump 18 through line 26 to the solids separation device 20. As noted above, the solids separation device 20 can assume various forms and does not require a highly precise separation device. In one embodiment, the solids separation device divides the sludge into two streams, a first stream and a second stream. The second sludge stream having hardness crystals contained therein is directed from the solids separation device 20 into reactor 14. Here the second sludge stream, including the hardness crystals, is mixed with the water and existing crystals in this reactor. The addition of the hardness crystals from the solids separation device 20 act as ballast and facilitates and encourages the further growth and secondary nucleation of the hardness crystals in reactor 14. From time-to-time or continuously some of the sludge being directed from the solids separation device 20 in to the second reactor 14 should be wasted. By wasting sludge, hardness in the form of hardness crystals and other contaminants are effectively removed from the water being treated.

The first sludge stream produced by the solids separation device 20 is directed to the mixing tank 22. The first sludge stream is mixed with a softening reagent which could be lime, soda ash or caustic, for example. As noted above, the mixing tank 22 is not essential inasmuch as the first sludge stream and the softening reagent could be directed into the first reactor 12 without being mixed in the mixing tank 22. In any event, the first sludge stream including hardness crystals and other solids is mixed together in the mixing tank 22 and then the mixture is directed into the first reactor 12. Again, it may be advisable to waste some sludge from the first sludge stream. Thus, as shown in FIG. 1, there is a waste sludge line that branches off the line that directs the first sludge stream to the mixing tank 22.

In another embodiment, the solids separation device 20 may be operated such that it effectively divides the hardness crystals or hardness particles into two groups, one group containing a majority of relatively small hardness particles or crystals and a second group containing a majority of relatively large hardness particles or crystals. The demarcation line may vary and it is expected that in practice there would be at least some relatively large and small particles in each group. However, in one example, the solids separation device could be operated such that the intent would be to separate the hardness particles and crystals into one group where a majority of the particles or crystals was less than 50 microns in size and the other group would include a size greater than 50 microns. In this exemplary embodiment, the sludge stream having a majority of relatively small particles or crystals is directed to the mixing tank 22 and, after being mixed with the softening reagent, is directed into the first reactor 12. By directing relatively small hardness particles or crystals to the first reactor 12, particle growth is promoted. The sludge stream having a majority of relatively large hardness particles or crystals is directed into the second reactor 14 and mixed with the water, flocculant, and existing hardness particles or crystals therein. These larger particles act as ballast and assist in the formation of larger floc to promote settling. This process also facilitates and promotes the continued growth of hardness crystals and the secondary nucleation process. It should be noted that even in this process some of the hardness particles, such as magnesium hydroxide particles, may not undergo a significant crystallization process. As such, magnesium hydroxide particles in the stream directed to the mixing tank 22 would be relatively small. These fines are wasted via the waste sludge line that leads from the line extending between the solids separation device 20 and the mixing tank 22.

Thus, it is appreciated that the present invention entails a process where hardness particles are precipitated from the water and, through a crystallization process, these particles grow and form crystals as they move from reactor 12 to and through reactor 14. The process further entails recovering these crystals and recycling them to upstream points in the process to further facilitate and promote the growth of hardness crystals which, in the end, because of their high settling rate, is an efficient means of removing hardness and other suspended solids from the wastewater being treated.

There are numerous advantages to the process described herein as compared to conventional softening processes. The level of total suspended solids that can be recycled and fed to the clarification unit 16 is much higher than can typically be achieved with conventional processes. It is hypothesized that the total suspended solids directed to the clarification unit 16 would be as high as 10,000 mg/L and higher. In conventional ballasted flocculation processes that utilize sand as a ballast, there is concern for "post-precipitation" of solids onto the sand. In the case of the present process, the process encourages "post-precipitation" of solids onto the recycled sludge. The concepts embodied in the present process allow for smaller reaction tanks as compared to conventional ballasted flocculation processes, for example. This is because in conventional designs for a sand ballasted process, the reactors are typically designed to allow for complete precipitation of solids prior to the addition of sand.

Figure 2:
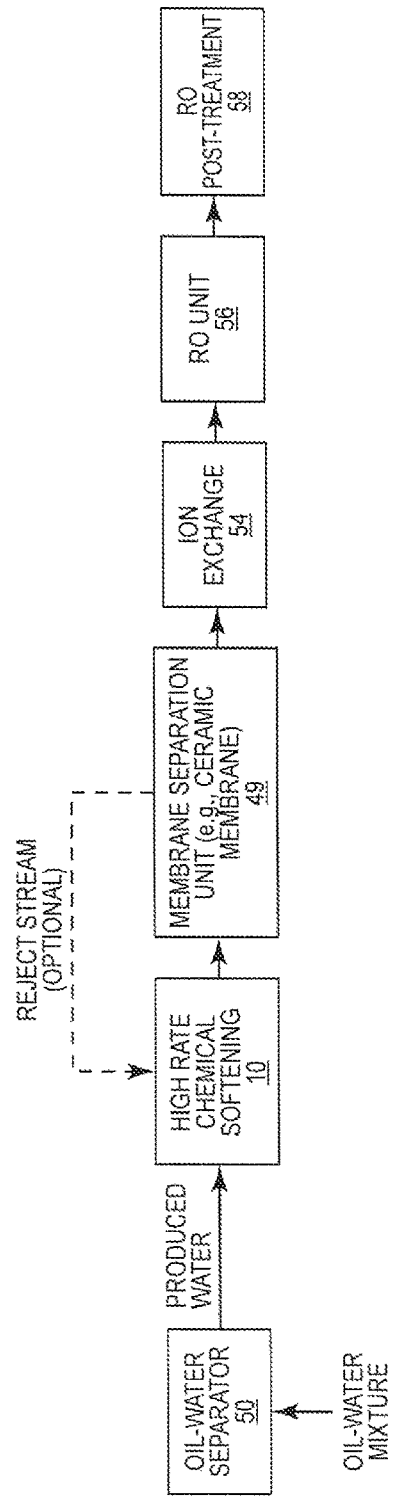
FIG. 2 is a schematic illustration of a process for treating produced water that employs the high rate chemical softening process shown in FIG. 1.
Figure 2A:
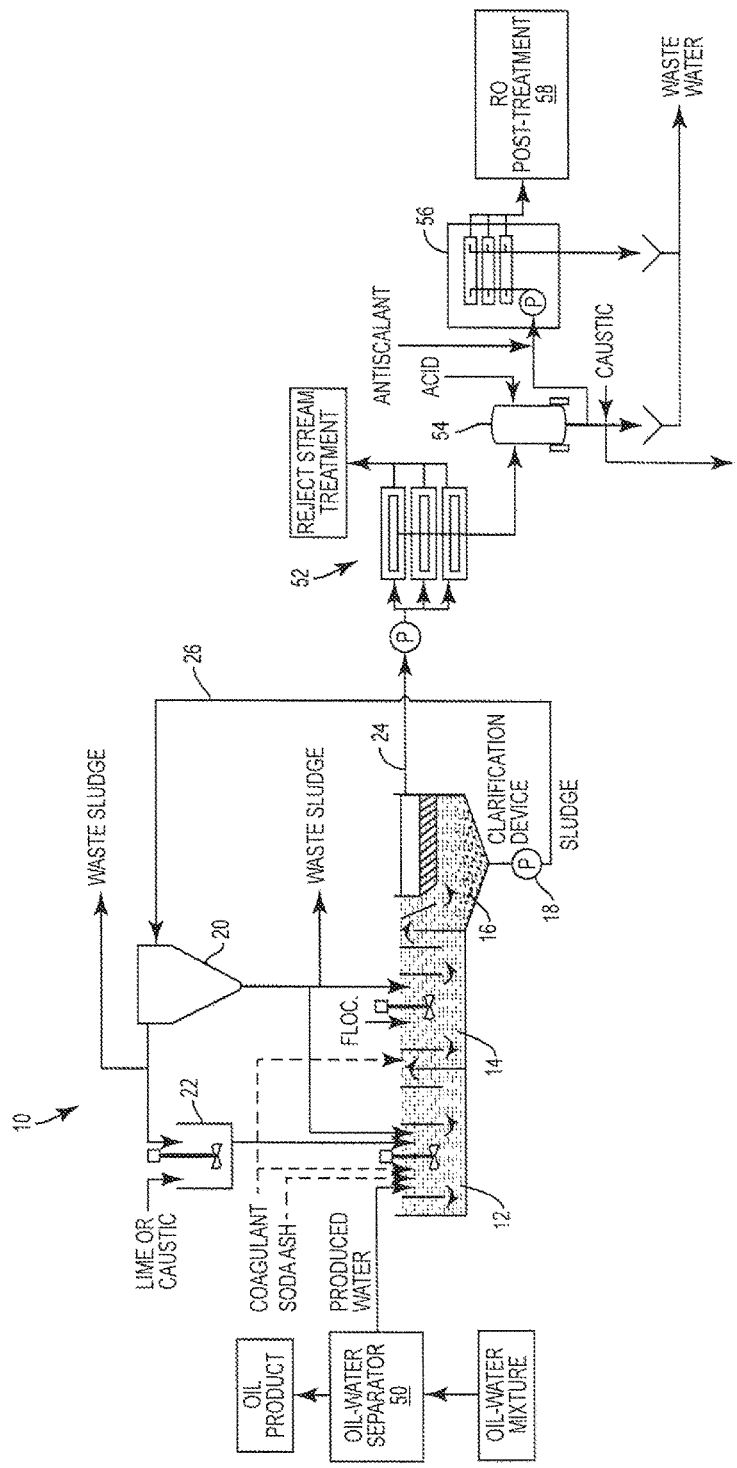
FIG. 2A is a schematic illustration of a process for treating produced water that is similar to the process depicted in FIG. 2.

Referring to FIGS. 2 and 2As, shown therein is a process for treating produced water that employs the high rate chemical softening system 10 shown in FIG. 1 and discussed above. Produced water typically contains organics, silica, hardness, dissolved solids and suspended solids. In the present process, hardness in the produced water is reduced by chemically softening the produced water in the high rate softening system 10 shown in FIG. 1. Prior to the water being directed to the high rate chemical softening system 10, the produced water is directed to an oil-water separator 50. The oil-water separator 50 separates an oil-water mixture into produced water and an oil product. It is the produced water that results from the oil-water separator 50 that is directed to the high rate chemical softening system 10.

During the softening process, the pH of the feedwater is raised to 10 or above, typically about 10.5. In some cases, a caustic addition may be employed in the process outside of the chemical softening system 10 if required. The clarified effluent produced in line 24 of FIG. 1 is then directed to a membrane separation unit 52. In this example, the membrane separation unit comprises a ceramic membrane system. As discussed above, some solids produced by the high rate chemical softening system 10 are wasted. However, typically there remains in the clarified effluent produced by the softening system 10 some suspended or precipitated solids that are removed by the ceramic membrane system. In addition to removing suspended solids and precipitated solids, the ceramic membrane is effective in removing free oil and emulsified oil. Although not specifically shown in the FIG. 2 embodiment, reject produced by the ceramic membrane system can be recycled to upstream points in the process and utilized to facilitate crystallization of solids that in turn facilitate the removal of the solids from the process.

As a general rule, the high rate chemical softening system 10 may not remove hardness down to very low levels. Since the system and process of FIG. 2 employs an RO unit 56 downstream from the membrane separation unit 52, it is desirable that hardness be removed to relatively low levels, on the order of 0.1 to 0.5 mg/L. To achieve this, an ion exchange unit 54 is employed downstream of the membrane separation unit 52. That is, the permeate stream produced by the membrane separation unit 52 is directed into the ion exchange unit 54 where residual hardness is removed. Various forms of ion exchange units can be used. In one embodiment, the ion exchange unit 54 is operated in the sodium mode.

The effluent from the ion exchange unit 54 is directed to the reverse osmosis unit 56. A pump is utilized to pump the effluent from the ion exchange unit 54 under pressure into the RO unit 56. The RO unit 56 will produce a reject stream that will include dissolved solids such as organics, silica, metals, etc. The permeate stream produced by the reverse osmosis unit 56 can be discharged or used in various ways. In some embodiments, the permeate produced by the reverse osmosis unit 56 is subjected to reverse osmosis post-treatment 58. Various post-treatments can be employed. For example, post-treatment may include reducing the pH of the permeate by injecting $CO_2$, removing ammonia from the permeate produced by the RO unit, or post-treatment might include an advanced oxidation system.

As noted above, the membrane separation unit 52 may include other types or forms of membranes. For example, a polymeric membrane system can be employed. However, ceramic membranes are desirable when dealing with water having a relatively high temperature. For example, ceramic membranes are effective when the water passing through them has a temperature approaching 300° F.

As noted above, the reject stream from the membrane separation unit 52 can be returned to various points in the process and more particularly can be returned to the high rate softening system 10. When the reject stream from the membrane separation unit is returned to the softening system 10, the reject steam may be directed to the solids separation device 20 or, in the alternative, the reject stream could be directed into mixing tank 22. These are only examples of how the reject stream from the membrane separation unit 52 may be treated. Other options would be appropriate.

Ion exchange unit 54 is of a conventional design which permits the same to be operatively connected to a regeneration unit for rejuvenating the ion exchange resin upon exhaustion. Although not shown, there is provided a recycle line operatively connected between the ion exchange unit 54 and the chemical softening system 10 that permits waste from the ion exchange unit to be recycled and treated. As an option, the waste from the ion exchange unit can be disposed of or further treated in other conventional processes.

In some cases, an antiscalant can be injected into the produced water stream ahead of the RO unit 56. See FIG. 2A. Addition of the antiscalant reagent provides a soluble chemical equilibrium for scale forming compounds across the downstream reverse osmosis unit 56.

It is appreciated that the wastewater treatment system shown in FIG. 2 can further include a second reverse osmosis unit. This is often referred to as a double-pass reverse osmosis system because the permeate produced by the first reverse osmosis unit 56 is directed to a second reverse osmosis unit for further treatment.

In other embodiments, the process of FIGS. 2 and 2A may include various pre-treatments prior to the high rate chemical softening process. For example, the produced water may be subjected to a degassing process prior to treatment in the chemical softening system 10. A degasification process is useful for feedwater containing volatile organic carbons and dissolved gases. In such cases, an acid is injected and mixed with the produced water to partially convert bicarbonates present in the feedwater to $CO_2$ and to maintain hydrogen sulfide or other dissolved gases in a gaseous state. Gases present in the water are then removed by a degasser. In one embodiment, the degasification process can utilize a force draft degasser or $DO_x$ stripper to reduce the $CO_2$ and the hydrogen sulfide present. Other types of degassers such as vacuum, membrane or depurator-type degassers can also be used. Typically the pH is lowered to a range of 4.5 to 6.5 ahead of the degasser and the effluent from the degasser is typically in the pH range of 5.0-7.0.

In some designs, the process shown in FIGS. 2 and 2A may include as a part of the pre-treatment process a gas flotation system. Typically gas flotation systems are useful for removing free oil from the produced water and reducing turbidity and the organic concentration.

The high rate chemical softening system 10 and the membrane separation unit (ceramic membrane) 52 work together to effectively and efficiently remove suspended solids, precipitants, free oil and emulsified oil. The chemical softening system 10 not only removes hardness in the form of hardness crystals and/or hardness precipitants, but with the addition of appropriate reagents can remove dissolved metals, silica and suspended solids. The operation of the high rate chemical softening system 10 can be designed to remove those solids that enable the membrane separation unit or ceramic membrane unit to operate efficiently and generally trouble-free. That is, the high rate chemical softening system 10 can be designed and controlled to remove certain forms of solids and certain amounts of solids that can be more efficiently removed in the chemical softening system than in the membrane separation unit. For example, in one case it may be desirable to remove the bulk of the solids in the high rate chemical softening system 10 and produce a clarified effluent therefrom that includes 200 mg/L or less of total suspended solids for removal in the membrane separation unit 52. In any event, it is hypothesized that the high rate chemical softening system 10 can be designed and controlled to maximize or increase the overall efficiency of the membrane separation unit 52.

For a more complete understanding of the present process and how the high rate chemical softening system 10 can be employed in a process for treating produced water or other waste streams, one is referred to U.S. patent application Ser. No. 13/443,971, entitled "Method of Recovering Oil or Gas and Treating the Resulting Produced Water", the contents of which are expressly incorporated herein by reference.

Figure 3:
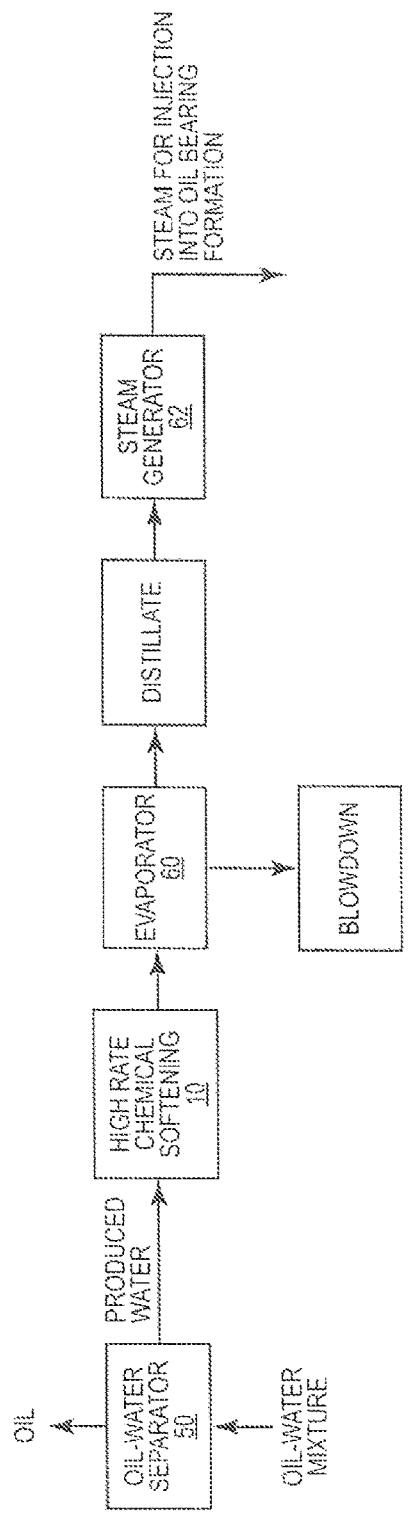
FIG. 3 is a schematic illustration of another produced water treatment process employing the high rate chemical softening process depicted in FIG. 1.
Figure 3A:
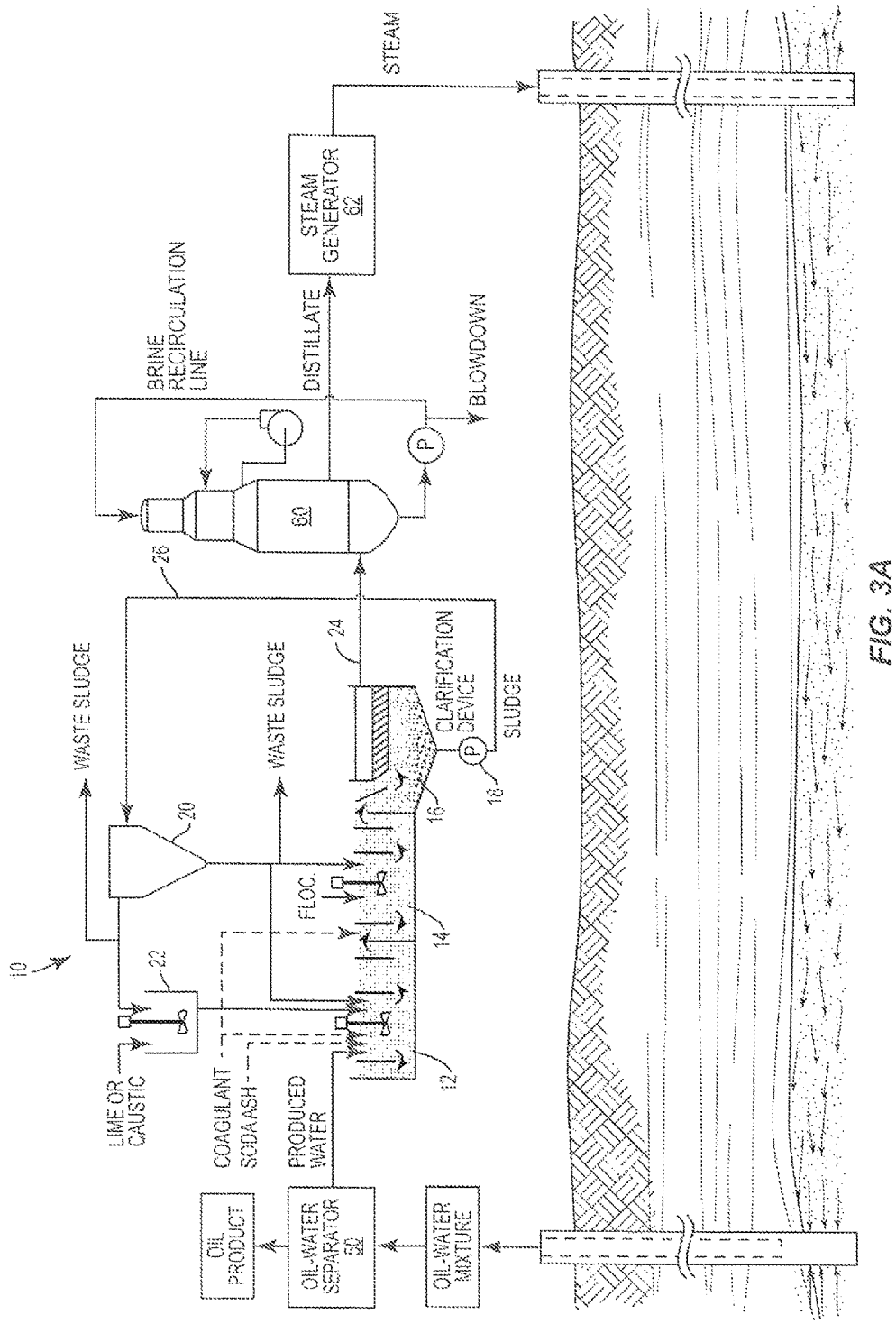
FIG. 3A is a schematic illustration of another process for treating produced water that is similar to the process shown in FIG. 3.

Turning to the FIGS. 3 and 3A design, this is another produced water process. It differs from the process shown in FIGS. 2 and 2A inasmuch as downstream of the high rate chemical softening system 10 there is provided an evaporator 60 and a steam generator 62. The high rate chemical softening system 10 receives the produced water after various pre-treatment steps are performed. As discussed above, the high rate chemical softening system 10 removes hardness. The objective here is to remove a substantial amount of hardness in order to prevent scaling or fouling of heat transfer tubes that form a part of the evaporator 60. In addition, as discussed above, the high rate chemical softening system 10 is effective to remove other contaminants such as suspended solids and other dissolved solids. In addition, some produced water includes relatively high concentrations of silica. Various processes can be employed upstream of the evaporator 60 to reduce the concentration of silica. One such process is often referred to as the sorption slurry process where magnesium oxide is added to the produced water. In this case, the magnesium oxide may be incorporated into the high rate chemical softening system 10. In any event, the magnesium oxide results in the precipitation of magnesium hydroxide and through an adsorption process, silica is adsorbed onto the magnesium hydroxide precipitants. For a more complete and unified understanding of this process, one is referred to the disclosure found in U.S. Pat. No. 7,905,283, the disclosures of which are expressly incorporated herein by reference.

In any event, the clarified effluent produced by the high rate chemical softening system 10 is directed to an evaporator 60 for further purification. Evaporator 60 produces steam and a concentrated brine. The steam is condensed to form a distillate and the distillate is directed to a steam generator that produces steam. Various forms and types of steam generators can be used, including but not limited to boilers and once-through steam generators.

Steam produced by the steam generator 62 is directed into an oil-bearing formation where the steam condenses and facilitates the removal of oil, especially oil that is referred to as heavy oil.

The evaporation process may be accomplished using any one of a variety of evaporators, including but not limited to mechanical vapor recompression evaporators, multiple effect evaporators, and falling film evaporators. In addition, the heat transfer surfaces of the evaporator can be a plate type or tubular type and can be horizontal or vertical, with evaporation occurring on either side of these surfaces.

Again, as discussed with the process in FIGS. 2 and 2A, the process in FIGS. 3 and 3A utilizes the high rate chemical softening system 10 to remove various contaminants, including hardness, that enable the evaporator 60 to efficiently purify the produced water. The pre-treatment by the high rate chemical softening system 10 reduces the solids load to the evaporator 60 and at the same time removes contaminants that are prone to scale or foul the evaporator, which results in costly maintenance and downtime.

Figure 4:
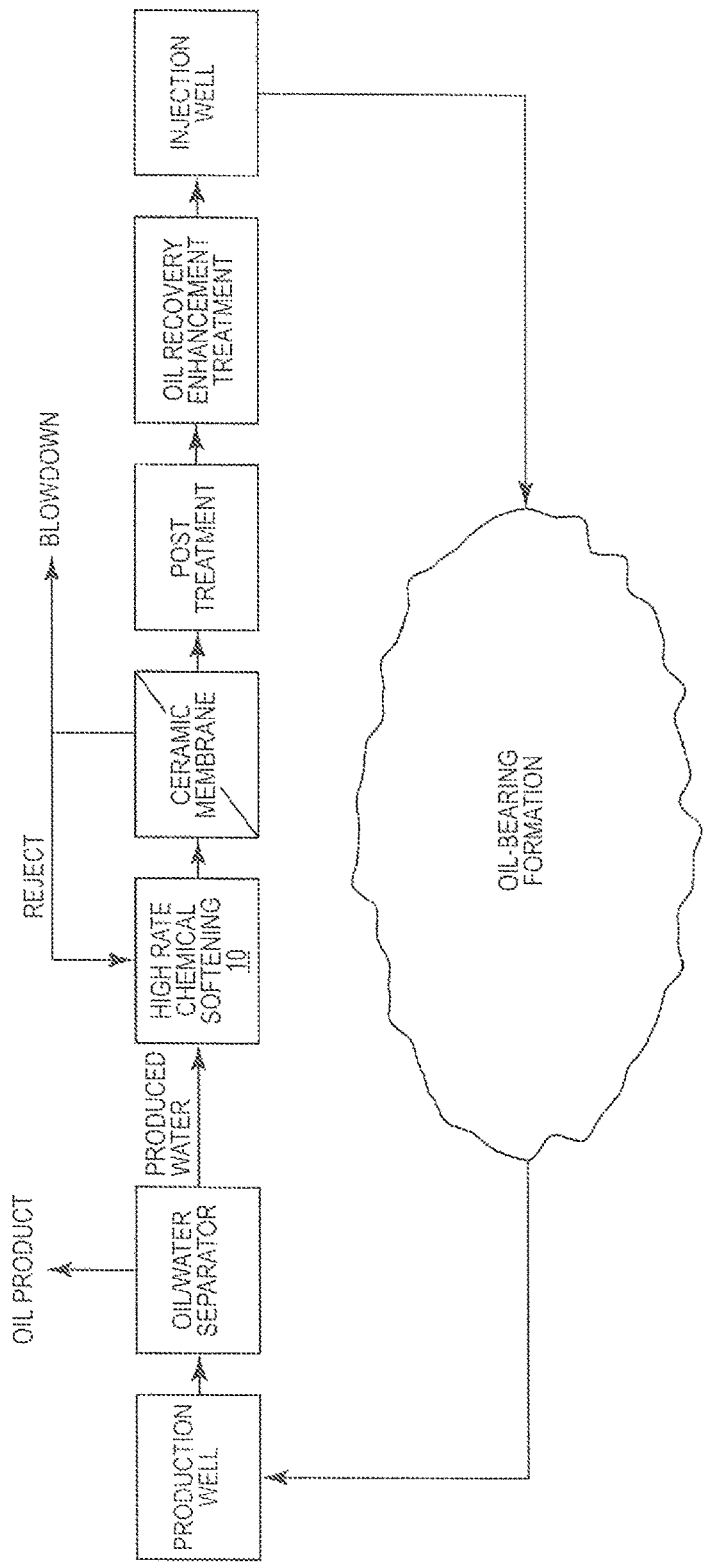
FIG. 4 is another produced water treatment process that employs the high rate chemical softening process shown in FIG. 1.

Turning to FIG. 4, a process is shown therein which relates to an oil recovery process where the permeate from a membrane separation unit such as a ceramic membrane is treated to enhance oil recovery. The process shown in FIG. 4 utilizes the high rate chemical softening system 10 in a pre-treatment process ahead of a membrane separation unit 52. In particular, this process addresses enhanced oil recovery (EOR) from an oil-bearing geologic formation in an oil field. In particular, the process addresses EOR where chemical flooding of oil-bearing formations is employed. The method disclosed herein entails removing hardness and other dissolved solids and suspended solids from the produced water stream by employing the high rate chemical softening system 10 shown in FIG. 1 and described above. The clarified effluent from system 10 is directed into a ceramic membrane which filters the produced water and removes residual suspended solids, precipitated hardness and scale-forming compounds, and other precipitants. A permeate stream is produced by the ceramic membrane and this permeate stream is treated to form a re-injection stream for injection into the oil-bearing formation. The ceramic membrane permeate stream is treated to enhance oil recovery in the oil-bearing formation and, as a part of that treatment in one embodiment, the treatment enhances the ability of the re-injection water to emulsify oil in the oil-bearing formation.

The process depicted in FIG. 4 includes directing an oil-water mixture from a producing well that is in fluid communication with an oil-bearing formation. The oil-water mixture directed from the producing well is subjected to an oil-water separation step from which produced water results. The produced water is directed to the high rate chemical softening system 10 which, as described above, removes hardness, other dissolved solids and suspended solids.

Pre-treated produced water may then be directed to a membrane separation unit such as a ceramic membrane system. The ceramic membrane functions to remove suspended solids, precipitants generated in pre-treatment, free oil and grease, and emulsified oil, some of which may be generated in an enhanced oil recovery process as discussed below. A permeate stream and reject stream, which comprises the removed material, are directed from ceramic membrane. A portion of the reject stream from ceramic membrane may be recycled to the chemical softening system 10, and another portion of the reject stream may be wasted as blowdown or further treated.

The permeate stream from the ceramic membrane is generally free of suspended solids, free oil, emulsified oil and hardness and other scale formers. A ceramic membrane post-treatment step that may include various purification sub-processes can be applied to the permeate stream from ceramic membrane. Sub-processes that may be employed in post-treatment include ion exchange residual softening, exposure to absorptive media, reverse osmosis, evaporation, nanofiltration, deaeration, and advanced oxidation among others. Sub-processes of post-treatment may be important in removing, for example, dissolved organic and inorganic matter, residual oxygen, the removal of which may be beneficial for water to be injected into certain kinds of formations.

Produced water is directed from the post-treatment step to a water enhancement step, where various enhancements may be performed as discussed below. The enhanced produced water is then directed into an injection well and thence into an oil-bearing formation from whence an oil-water mixture is extracted via the producing well.

Turning now to a more detailed description of the water enhancement process, it is appreciated that enhancements provided in this step function in cooperation with the ceramic membrane system to increase oil recovery from the formation. Generally, the processes embodied in the schematic of FIG. 4 can be considered as oil recovery by chemically-amended water flooding, sometimes referred to simply as chemical flooding. Water flooding may be undertaken after other recovery operations have been completed and residual oil remains in the formation, or water flooding may be used as a primary recovery operation in some formations. In general, water flooding interacts within the formation to remove oil from the formation and mobilize the oil in an oil-water mixture for removal topside. Chemical flooding, while employing much of the infrastructure of water flooding, entails the addition of certain chemicals to the water to enhance or improve extraction of oil from the formation. Thus, various chemicals may be added to the produced water in the enhancement step, and these chemicals aid in various ways in the mobilization of the oil held in the formation and in mixing the oil with the water. Chemical flooding may also be used on fields for which other extraction techniques have reached their potential, or it may be used on virgin fields.

As discussed above, various chemicals may be used for chemical flooding. For example, polymeric compounds may be added to the water to enhance recovery by viscosity adjustment. Polymeric compounds added to the water tend to increase the viscosity of the water which improves the mobility ratio relative to oil recovery. Increased viscosity of the water may reduce viscous fingering, where thinner water and thicker oil result in "fingers" of water moving without entraining the oil in the flow of the water. Increasing the viscosity of the water to be injected reduces this "fingering" phenomenon and results in enhanced oil recovery from the formation. The polymer is typically added until its concentration in the produced water to be injected increases the viscosity up to the oil viscosity. This tends to achieve a mobility ratio closer to 1 to enable better sweep of the oil from the rock with the water by avoiding the fingering through the oil pockets. There may also be formation-related viscosity issues, such as permeability of the formation. Typically the oil-water mobility ratio is the controlling factor on the polymer addition when formation permeability ranges between about 50 mD and about 10,000 mD.

Compounds that elevate pH, alkali compounds for example, may also be added to the injection water to enhance oil recovery. Adding alkali can improve the wettability of some formations when flooded with such alkali-enhanced water. Mobilization of certain oils or crudes may be enhanced by saponification, or soap formation, enabled by the alkali. By Adding alkali, pH and salinity may also be adjusted, and chemical loss may be reduced due to alteration in rock chemistry. Alkali compounds are used based on an amount required to saponify the crude oil. Alkali dose rate then depends on the crude soap-formation characteristic. Soap formation leads to natural oil-in-water emulsion formation, which reduces the need for dosing with surfactants. As one example, napthanic crudes have a higher tendency to saponify, so more caustic, or alkali, and less surfactant may be used to emulsify these crudes. There are also certain formation characteristics that must be considered in determining alkali dose rates. For example, the pH increase due to alkali addition may often impact rock wettability and surfactant as well as polymer adsorption characteristics. Often hardness and other scale formers, and divalent ions lead to limitations on the effectiveness of the alkali because alkali will tend to precipitate the hardness and other scale-forming compounds, leading to TSS and formation plugging. The present invention, however, provides for removal of hardness, scale formers and divalent ions, which tends to obviate this concern. The lack of adequately softened injection water calls for using only polymer and surfactant addition to the injection. However the produced water softening and provision of high pH injection water afforded by the present process addresses this issue in that there is improved rock surface chemistry control and less surfactant needed.

Additionally, direct surfactant compounds may be added in the water enhancement. Surfactants in the flood water also improve formation wettability, reduce oil-water interfacial tension as indicated above, and stimulate direct emulsification of the oil into a chemical oil and water emulsion. The surfactant dose and compound blend are determined based on the interfacial tension between the oil and water. Surfactant may be added to reduce the oil-water interfacial tension down to about 10 mN/m. Lower surface tension enables better contact and mixing between oil and water, and it ultimately generates oil-in-water emulsions which tend to mobilize most of the oil out of the formation. Additionally, surfactant attachment to the formation rocks must be discouraged, and the surfactant must withstand the salinity, temperature, hardness, scale formers and divalent ions to be effective.

The so-called alkali-surfactant-polymer (ASP) chemical flooding, as discussed above, combines alkali, surfactant, and polymer chemicals in water blends for chemical flooding. The proportions and strengths of the chemicals are dependent on characteristics of the geologic formation, and they may vary from formation to formation, being tuned to maximize extraction and to optimize extraction cost. Beyond those discussed above, further synergies also exist between ASP addition that improve control of surfactant adsorption on formation rock, enhance rock wettability control, stimulate natural emulsification of the oil, all of which may lead to reduced chemical consumption. Whatever the blend of chemicals utilized, such chemical flooding results in produced water having generally hardness, scale formers, total dissolved solids, residual enhancement chemicals, and residual oil and grease, which present a challenging stream to be treated for direct use to recycle as blend water.

The present process, in one embodiment, applies the operational characteristics of a ceramic membrane to remove precipitated hardness and other scale formers, suspended solids, free oil and grease and emulsified oil from the produced water. Again it should be pointed out that the high rate chemical softening system 10 will remove a substantial amount of precipitated hardness, suspended solids, etc. In this process and in at least one embodiment, the ceramic membrane effectively removes the residual precipitants and suspended solids in the produced water. In this way, the produced water is generally oil-free and free of suspended matter that would otherwise present infrastructure scaling and plugging. The ceramic membrane may advantageously be operationally more stable than more complicated alternatives. Stability of operation is important in that levels of residual oil and other contaminants may vary widely in typical EOR operations.

Details of the ceramic membrane are not dealt with herein because such is not per se material to the present invention, and further, ceramic membranes are known in the art. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types. In some cases the ceramic membrane may be of the type that produces both a permeate stream and a continuously flowing reject stream. On the other hand, the ceramic membranes may be of the dead head type, which only produces a permeate stream and from time-to-time the retentate is backflushed or otherwise removed from the membrane.

The structure and materials of ceramic membranes as well as the flow characteristics of ceramic membranes varies. When ceramic membranes are used to purify produced water, the ceramic membranes are designed to withstand relatively high temperatures as it is not uncommon for the produced water being filtered by the ceramic membranes to have a temperature of approximately 90° C. or higher.

Ceramic membranes normally have an asymmetrical structure composed of at least two, mostly three, different porosity levels. Indeed, before applying the active, microporous top layer, an intermediate layer is formed with a pore size between that of the support and a microfiltration separation layer. The macroporous support ensures the mechanical resistance of the filter.

Ceramic membranes are often formed into an asymmetric, multi-channel element. These elements are grouped together in housings, and these membrane modules can withstand high temperatures, extreme acidity or alkalinity and high operating pressures, making them suitable for many applications where polymeric and other inorganic membranes cannot be used. Several membrane pore sizes are available to suit specific filtration needs covering microfiltration and ultrafiltration ranges.

Ceramic membranes today run the gamut of materials (from alpha alumina to zircon). The most common membranes are made of Al, Si, Ti or Zr oxides, with Ti and Zr oxides being more stable than Al or Si oxides. Silicon carbide (non-oxide) membranes are also gaining market presence. In some less frequent cases, Sn or Hf are used as base elements. Each oxide has a different surface charge in solution. Other membranes can be composed of mixed oxides of two of the previous elements, or are established by some additional compounds present in minor concentration. Low fouling polymeric coatings for ceramic membranes are also available.

Ceramic membranes are typically operated in the cross flow filtration mode. This mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

Figure 5:
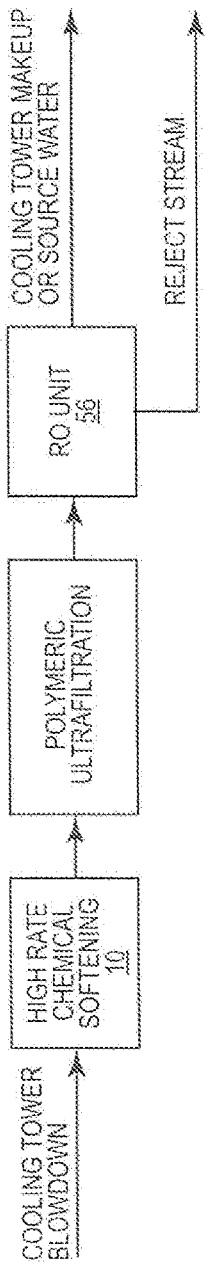
FIG. 5 is a schematic illustration of a cooling tower blowdown treatment process that employs the high rate chemical softening process disclosed herein.
Figure 6:
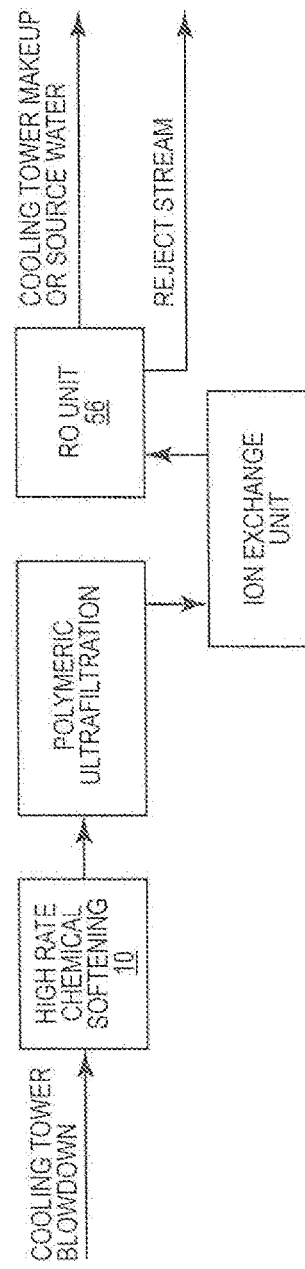
FIG. 6 is a view similar to FIG. 5 but which includes an ion exchange device upstream of the RO unit.

Now viewing FIGS. 5 and 6, there is shown therein a process for treating cooling tower blowdown or other waste streams. In the case of FIG. 5, cooling tower blowdown is directed into the high rate chemical softening system 10. The clarified effluent produced by the system 10 is directed to a membrane separation unit which, in one embodiment, include a polymeric ultrafiltration unit. There the effluent from the high rate chemical softening system 10 is filtered and produces a permeate stream and a reject stream. The permeate stream is then directed to an RO unit 56 where the RO unit removes dissolved solids from the influent thereto to generate a permeate stream that is relatively free of dissolved solids. The dissolved solids removed by the RO unit 56 are contained in the reject stream produced by the reverse osmosis unit 56. The permeate from the RO unit 56 can be utilized as cooling tower makeup or source water. Again, the high rate chemical softening system 10 plays an important role in pre-treating the water ahead of the polymeric ultrafiltration membrane that is disclosed in this particular embodiment. By removing hardness and other contaminants from the feedwater stream, the ultrafiltration membrane unit is able to operate more efficiently without scaling or fouling. The same applies to the RO unit 56. The hardness and other contaminants removed by the high rate chemical softening system 10 enables the RO unit 56 to operate more efficiently.

The process shown in FIG. 6 is similar to that shown in FIG. 5 and described above except an ion exchange unit is incorporated upstream of the RO unit. Again, the function of the ion exchange would be to remove residual hardness that is left over after treatment in the high rate chemical softening system 10. This may be desirable in some applications where it is advisable to remove hardness down to very low levels in the feed prior to the feed being directed into the RO unit 56.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating produced water recovered from an oil well comprising:
    recovering an oil-water mixture from the oil well;
    separating oil from the oil-water mixture to produce an oil product and produced water having hardness and suspended solids;
    subjecting the produced water to a softening process for removing hardness from the produced water, including reacting a softening reagent with the produced water and precipitating hardness precipitants;
    crystallizing the hardness precipitants and causing the hardness precipitants to grow and form hardness crystals;
    clarifying the produced water having the hardness crystals therein to produce a clarified effluent and a sludge having the hardness crystals therein;
    directing the sludge to a separator and separating the sludge into two streams, a first stream having hardness crystals therein and a second stream having hardness crystals therein;
    mixing the first stream having the hardness crystals therein with the produced water and the softening reagent at a first location in the softening process and mixing the second stream with hardness crystals therein with the produced water at a second location downstream from the first location;
    wherein at least some of the hardness crystals grow and form hardness ballast;
    agglomerating the suspended solids in the produced water around the hardness ballast;
    wasting a portion of the sludge;
    directing the clarified effluent produced in the softening process to a membrane separation unit; and
    filtering the clarified effluent with the membrane separation unit to produce a permeate stream and a reject stream.

2. The method of claim 1 wherein the produced water includes oil and wherein the membrane separation unit includes a ceramic membrane and the method includes directing the produced water into the ceramic membrane and filtering the oil and precipitated solids from the produced water.

3. The method of claim 1 including recycling at least a portion of the reject stream to the softening process or to a point upstream of the softening process.

4. The method of claim 1 including directing the permeate stream to an ion exchange unit and treating the permeate stream in the ion exchange unit to remove residual hardness.

5. The method of claim 4 wherein the ion exchange unit produces an effluent and the method includes directing the ion exchange effluent to a reverse osmosis (RO) unit and removing dissolved solids from the ion exchange effluent and, in the process, producing an RO permeate stream and an RO reject stream.

6. The method of claim 5 including treating the RO permeate stream by injecting $CO_2$ into the permeate stream, removing ammonia from the RO permeate stream, or treating the RO permeate stream in an oxidation system.

7. The method of claim 1 wherein prior to subjecting the produced water to the softening process, mixing an acid with the produced water to convert bicarbonates to $CO_2$ and thereafter removing $CO_2$ from the produced water through a degassing process.

8. The method of claim 1 including directing the permeate stream to an ion exchange unit and treating the permeate stream in the ion exchange unit to remove residual hardness;
    wherein the ion exchange unit produces an effluent and the method further includes directing the ion exchange effluent to an RO unit and removing dissolved solids from the ion exchange effluent and in the process producing an RO permeate stream and an RO reject stream.

9. The method of claim 1 including treating the permeate stream from the membrane separation unit and directing the treated permeate stream into an oil-bearing formation where the treated permeate stream mixes with oil in the oil-bearing formation to form the oil-water mixture.

10. The method of claim 1 including directing, directly or indirectly, the permeate stream from the membrane separation unit into an evaporator and evaporating at least a portion of the permeate stream to produce a distillate and a concentrated brine.

11. The method of claim 10 including directing the distillate to a steam generator and generating steam.

12. The method of claim 11 including directing the steam into an oil-bearing formation where the steam condenses and facilitates the removal of oil from the oil-bearing formation.

13. The method of claim 1 including subjecting the permeate stream from the membrane separation unit to a water enhancement process including adding chemicals to the permeate stream and directing the permeate stream with the added chemicals into an oil-bearing formation.

14. The method of claim 13 including adding one or more polymeric compounds to the permeate stream to enhance oil recovery by viscosity adjustment.

15. The method of claim 13 including adding one or more alkali compounds to the permeate stream to increase the pH of the permeate stream and, in turn, improve the wettability of the oil-bearing formation.

* * * * *